(12) United States Patent
Iyer et al.

(10) Patent No.: US 12,340,580 B2
(45) Date of Patent: Jun. 24, 2025

(54) METHOD AND ELECTRONIC DEVICE FOR RECOGNIZING IMAGE CONTEXT

(71) Applicant: SAMSUNG ELECTRONICS CO., LTD., Suwon-si (KR)

(72) Inventors: Kiran Nanjunda Iyer, Bengaluru (IN); Biplab Ch Das, Bengaluru (IN); Sathish Chalasani, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 17/983,135

(22) Filed: Nov. 8, 2022

(65) Prior Publication Data
US 2023/0147843 A1    May 11, 2023

(30) Foreign Application Priority Data

Nov. 8, 2021   (IN) .............................. 202141051048
Aug. 24, 2022  (IN) .............................. 202141051048

(51) Int. Cl.
| | |
|---|---|
| G06V 20/40 | (2022.01) |
| G06V 10/44 | (2022.01) |
| G06V 10/62 | (2022.01) |
| G06V 20/50 | (2022.01) |
| G06V 20/70 | (2022.01) |

(52) U.S. Cl.
CPC .............. *G06V 20/41* (2022.01); *G06V 10/44* (2022.01); *G06V 10/62* (2022.01); *G06V 20/50* (2022.01); *G06V 20/70* (2022.01); *G06V 2201/07* (2022.01)

(58) Field of Classification Search
CPC ........ G06V 20/41; G06V 10/44; G06V 10/62; G06V 20/50; G06V 20/70; G06V 2201/07; G06V 10/776; G06V 10/98; G06V 10/82; G06V 20/60
See application file for complete search history.

(56) References Cited

U.S. PATENT DOCUMENTS

| | | | |
|---|---|---|---|
| 9,225,879 B2 * | 12/2015 | Kappeler ............. | G11B 27/034 |
| 9,679,257 B2 | 6/2017 | Hannuksela et al. | |
| 10,755,128 B2 | 8/2020 | Turkelson et al. | |
| 2014/0063315 A1 | 3/2014 | Lee et al. | |
| 2015/0039632 A1 | 2/2015 | Leppanen et al. | |
| 2017/0351917 A1 | 12/2017 | Son et al. | |

OTHER PUBLICATIONS

"Ciocca Gianluigi et al., An Innovative Algorithm for Keyframe Extracting in Video Summarization, Jul. 2006, Journal of Real-Time Image Processing, vol. 1, pp. 69-88" (Year: 2006).*

(Continued)

*Primary Examiner* — Chineyere Wills-Burns
*Assistant Examiner* — Phuong Hau Cai
(74) *Attorney, Agent, or Firm* — Sughrue Mion, PLLC (57) ABSTRACT

A method for recognizing image context by an electronic device includes capturing a first image frame from a preview of an imaging sensor of the electronic device, recognizing a first scene that is captured in the first image frame, recognizing second scenes in a plurality of image frames that is not captured in the first image frame, and determining contextual information of the first image frame based on the first scene and the second scenes.

12 Claims, 9 Drawing Sheets

(56) References Cited

OTHER PUBLICATIONS

"Sivapriyaa Kannappan, Key-frame Analysis and Extraction for Automatic Summarization of Real-time Videos, May 2019, Aberystwyth Univ., Doctoral Thesis, Department of Computer Science" (Year: 2019).*

"Andrew W. Fitzgibbon et al., Automatic Camera Recovery for Closed and Open Image Sequences, 1988, Computer Vison, 5th European Conference on Computer Vision, Freiburg" (Year: 1988).*

"Xiangyong Yuan et al., Audiovisual Temporal Recalibration: Space-Based Versus Context-Based, Jan. 2012, Perception, vol. 41, Issue 10, pp. 1218-1233" (Year: 2012).*

"Cheng Wang et al., Image Captioning with Deep Bidirectional lstms, 2016 Proceedings of the 2016 ACM on Multimedia Conference, pp. 988-997" (Year: 2016).*

Communication dated Dec. 13, 2023, issued by Indian Patent Office in Indian Patent Application No. 202141051048.

Communication dated Mar. 27, 2025, issued by Indian Patent Office in Indian Patent Application No. 202141051048.

* cited by examiner

METHOD AND ELECTRONIC DEVICE FOR RECOGNIZING IMAGE CONTEXT

CROSS-REFERENCE TO RELATED APPLICATION(S)

This application is based on and claims priority under 35 U.S.C. § 119 to Indian Provisional Application No. 202141051048, filed on Nov. 8, 2021, and Indian Patent Application No. 202141051048, filed on Aug. 24, 2022, the disclosures of which are incorporated by reference herein in their entireties.

BACKGROUND

1. Field

The disclosure relates to an electronic device, and more specifically to an electronic device and a method for recognizing image context of a captured image frame.

2. Description of Related Art

Figure 8:
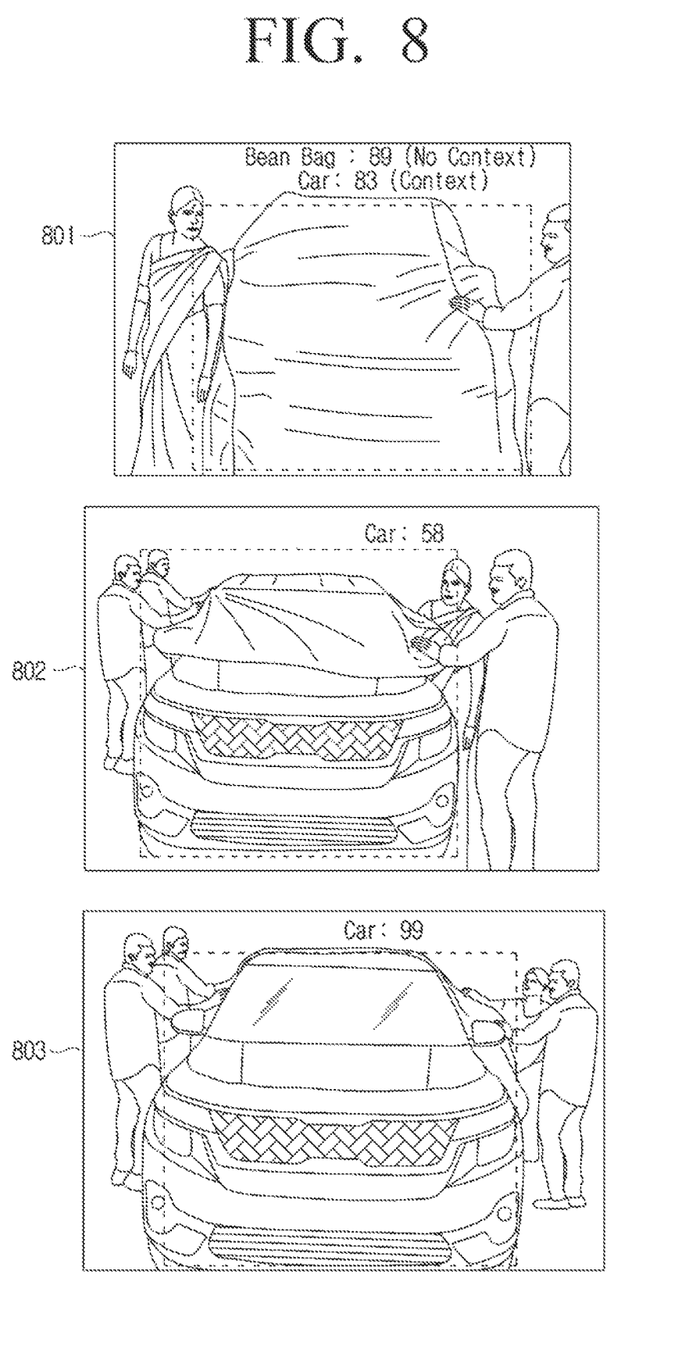
FIGS. 8 and 9 illustrate example scenarios of determining the contextual information of the captured image frame, according to an embodiment.
Figure 9:
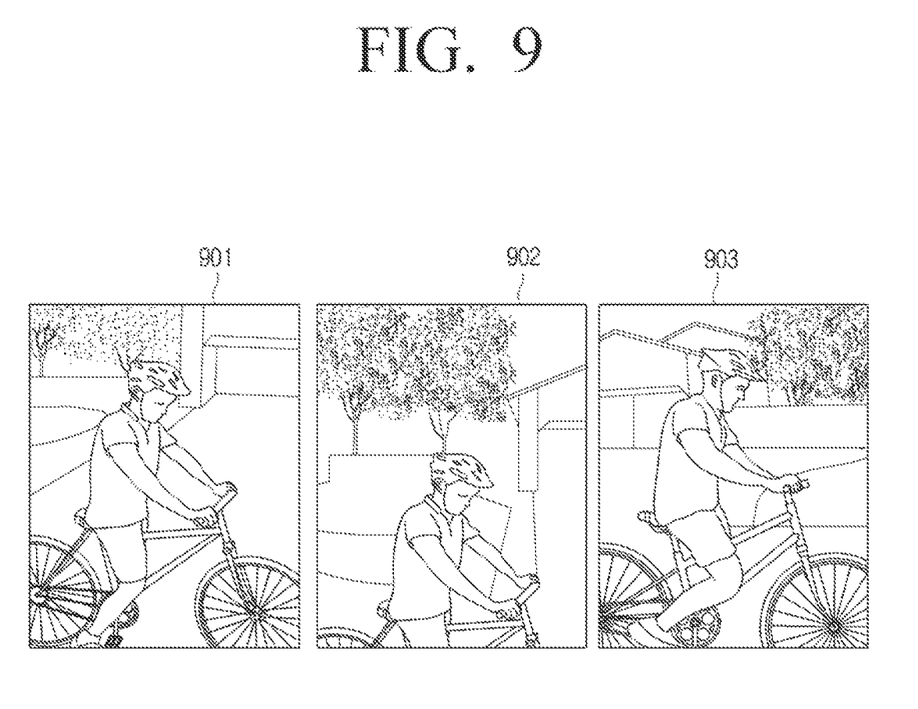

Powerful on-device artificial intelligence engines provide various features in a camera application and a gallery application of devices such as smartphones. However, there is gap between how visual information is analyzed on the camera application and the gallery application. In certain situations, the analysis gap leads to incorrect analysis of semantics specifically in the gallery application, thereby affecting user experience. For example, an example of uncovering a car in a car showroom is shown in FIG. 8. While capturing an image 801, a scene is: the car is covered with a cover. The covered car in the captured image 801 actually looks like a bean bag, and related art devices determine a context of the image 801 as "bean bag" instead of "car". As another example, an example scenario of riding a cycle by a person is shown in FIG. 9. While capturing an image 902, the scene is: an upper portion of the person, in which the cycle is not visible. The captured image 902 includes only the upper portion of the person, and the related art devices determine the context of the image 902 as "a person" instead of "a person riding the cycle".

In the camera application, a semantic engine analyses incoming visual data in real-time preview or capture and extracts semantic information based on the analysis. This semantic information is used only in specific use case and the information is not transmitted to the gallery application. Whereas in the gallery application, the semantic engine analyses each captured image through a background process. When a user is searching for a photo/video, these semantics are utilized to provide search results. It's hard for the semantic engine to analyze a single image stored in the gallery application and infer a context of the image in all situations. This is specifically true for cases where temporal information holds an important clue for semantics. When a user is looking for a specific context photo while searching in the gallery application but is unable to find such images, the device may provide incorrect predictions for photos and different from the actual context. Thus, it is desired to provide a useful alternative for recognizing image context of a captured image.

SUMMARY

According to an aspect of the disclosure, a method for recognizing image context by an electronic device includes: capturing a first image frame from a preview of an imaging sensor of the electronic device; recognizing a first scene that is captured in the first image frame; recognizing at least one second scene in a plurality of image frames that is not captured in the first image frame; and determining contextual information of the first image frame based on the first scene and the at least one second scene.

The method may further include storing the contextual information as metadata along with the first image frame.

The determining the contextual information of the first image frame based on the first scene and the at least one second scene may include: identifying objects in the first image frame; identifying objects that disappeared in the first image frame with reference to the plurality of image frames; recovering the objects that disappeared in the first image frame with reference to the plurality of image frames using a heuristics based linear constraints and a linear cost function; and determining the contextual information of the first image frame based on the objects in the first image frame and the recovered objects.

The identifying the objects that disappeared in the first image frame with reference to the plurality of image frames may include: extracting visual features from the first scene and the at least one second scene; performing bidirectional temporal shifting of the visual features in temporal dimension; determining attention weights for each visual feature of the at least one second scene corresponding to each visual feature of the first scene by applying a contextual attention on the temporally shifted features; determining context of the first scene and the at least one second scene by averaging the temporal shifted visual features using the attention weights; determining contextual stable visual features by concatenating the context of the first scene and the at least one second scene with each visual feature of the first scene and the at least one second scene; reducing a dimension of the contextual stable visual features; updating the dimensionally reduced contextual stable features and the objects in the first image frame; and performing an assignment of the objects in the first image frame with reference to the objects in the plurality of image frames for identifying the objects that disappeared in the first image frame with reference to the plurality of image frames.

The method may further include tagging the image frame with the contextual information in the preview.

The method may further include receiving an input from the user; and editing the contextual information based on the input from the user.

According to an aspect of the disclosure, an electronic device for recognizing image context, includes a memory storing instructions; a processor; and an imaging sensor, wherein the processor is configured to execute the instructions to: capture a first image frame from a preview of the imaging sensor; recognize a first scene that is captured in the first image frame; recognize at least one second scene in a plurality of image frames that is not captured in the first image frame; and determine contextual information of the first image frame based on the first scene and the at least one second scene.

The processor may be further configured to: store the contextual information as metadata along with the first image frame.

The processor may be further configured to: identify objects in the first image frame; identify objects that disappeared in the first image frame with reference to the plurality of image frames; recover the objects that disappeared in the first image frame with reference to the plurality of image frames using a heuristics based linear constraints and a linear cost function; and determine the contextual information of the first image frame based on the objects in the first image frame and the recovered objects.

The processor may be further configured to: extract visual features from the first scene and the at least one second scene; perform bidirectional temporal shifting of the visual features in temporal dimension; determine attention weights for each visual feature of the at least one second scene corresponding to each visual feature of the first scene by applying a contextual attention on the temporally shifted features; determine context of the first scene and the at least one second scene by averaging the temporal shifted visual features using the attention weights; determine contextual stable visual features by concatenating the context of the first scene and the at least one second scene with each visual feature of the first scene and the at least one second scene; reduce a dimension of the contextual stable visual features; update the dimensionally reduced contextual stable features and the objects in the first image frame; and perform an assignment of the objects in the first image frame with reference to the objects in the plurality of image frames for identifying the objects that disappeared in the first image frame with reference to the plurality of image frames.

The processor may be further configured to: tag the image frame with the contextual information in the preview.

The processor may be further configured to: receive an input from the user; and edit the contextual information based on the input from the user.

According to an aspect of the disclosure, a non-transitory computer readable medium for storing computer readable program code or instructions which are executable by a processor to perform a method for recognizing image context is provided. The method includes: capturing a first image frame from a preview of an imaging sensor of an electronic device; recognizing a first scene that is captured in the first image frame; recognizing at least one second scene in a plurality of image frames that is not captured in the first image frame; and determining contextual information of the first image frame based on the first scene and the at least one second scene.

The method may further include storing the contextual information as metadata along with the first image frame.

The determining the contextual information of the first image frame based on the first scene and the at least one second scene may include: identifying objects in the first image frame; identifying objects that disappeared in the first image frame with reference to the plurality of image frames; recovering the objects that disappeared in the first image frame with reference to the plurality of image frames using a heuristics based linear constraints and a linear cost function; and determining the contextual information of the first image frame based on the objects in the first image frame and the recovered objects.

The identifying the objects that disappeared in the first image frame with reference to the plurality of image frames may include: extracting visual features from the first scene and the at least one second scene; performing bidirectional temporal shifting of the visual features in temporal dimension; determining attention weights for each visual feature of the at least one second scene corresponding to each visual feature of the first scene by applying a contextual attention on the temporally shifted features; determining context of the first scene and the at least one second scene by averaging the temporal shifted visual features using the attention weights; determining contextual stable visual features by concatenating the context of the first scene and the at least one second scene with each visual feature of the first scene and the at least one second scene; reducing a dimension of the contextual stable visual features; updating the dimensionally reduced contextual stable features and the objects in the first image frame; and performing an assignment of the objects in the first image frame with reference to the objects in the plurality of image frames for identifying the objects disappeared in the first image frame with reference to the plurality of image frames.

The method may further include tagging the image frame with the contextual information in the preview.

The method may further include receiving an input from the user; and editing the contextual information based on the input from the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "frame", "image" and "image frame" are used interchangeably and mean the same.

The electronic device according to one or more embodiments improves captured image frame's semantics by using past and quasi future preview image frames not captured by the user. The electronic device generates more accurate and precise tags for captured scenes with partial information such as occlusions, incomplete context etc. Further, the electronic device stores the generated tags as metadata along with the captured image frame.

The electronic device according to one or more embodiments improves predictions for occluded images, or images with partial information using the context. The electronic device is more accurate in identifying the scenes when a salient and discriminating object is not visible in the captured image frame, but from previous contextual frames and quasi future, the electronic device is able to classify the scene well.

The electronic device according to one or more embodiments enables power saving as a decoder is not used for analyzing the captured image. The proposed context-based image analysis technology improves gallery experience like never before. With this technology, developers can use more accurate tags for features like story generation, live photos, visual search, content based related media suggestion and user gallery personalization. None of the existing methods and systems explicitly use the preview context to improve the tags/detections quality of the capture the image frame in real-time and store the context as the metadata of the image frame.

Hereinafter, embodiments of the present disclosure will be described in detail with reference to the accompanying drawings.

Figure 1:
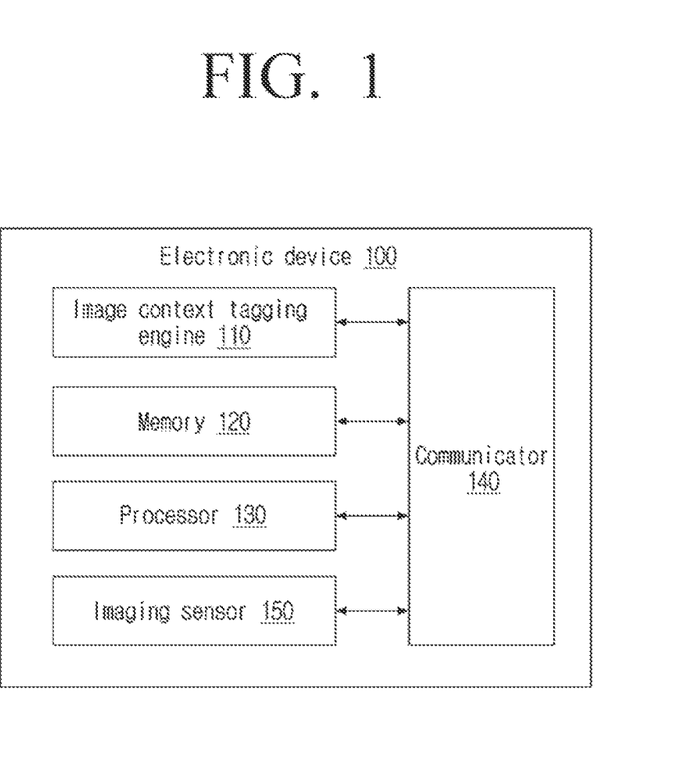
FIG. 1 is a block diagram of an electronic device for recognizing image context of a captured image frame, according to an embodiment.

FIG. 1 is a block diagram of an electronic device 100 for recognizing image context of a captured image frame, according to an embodiment. Examples of the electronic device 100 include, but are not limited to a smartphone, a tablet computer, a Personal Digital Assistance (PDA), a desktop computer, an Internet of Things (IoT), a wearable device, etc. In an embodiment, the electronic device 100 includes an image context tagging engine 110, a memory 120, a processor 130, a communicator 140, and an imaging sensor 150. The image context tagging engine 110 is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The image context tagging engine 110 captures a first image frame from a preview of the imaging sensor 150. Further, the image context tagging engine 110 recognizes a first scene that is captured in the first image frame. Further, the image context tagging engine 110 recognizes second scenes in a plurality of image frames that is not captured in the first image frame. Further, the image context tagging engine 110 determines contextual information of the first image frame based on the first scene and second scenes. In an example, consider the first image frame shows a scene of a birthday cake cutting, then the contextual information can be birthday celebration. Further, the image context tagging engine 110 stores the contextual information as metadata along with the first image frame in the memory 120. In an embodiment, the image context tagging engine 110 tags the first image frame with the contextual information. In another embodiment, the image context tagging engine 110 receives an input from the user and edits the contextual information based on the input from the user.

In an embodiment, the image context tagging engine 110 identifies objects in the first image frame. Further, the image context tagging engine 110 identifies objects which have disappeared in the first image frame with reference to the plurality of image frames. Further, the image context tagging engine 110 recovers the objects disappeared in the first image frame with reference to the plurality of image frames using a heuristics based linear constraints and a linear cost function. Further, the image context tagging engine 110 determines the contextual information of the first image frame based on the objects in the first image frame and the recovered objects.

In an embodiment, the image context tagging engine 110 extracts visual features from the first scene and the second scenes. Further, the image context tagging engine 110 performs bidirectional temporal shifting of the visual features in temporal dimension. Further, the image context tagging engine 110 determines attention weights for each visual feature of the second scenes corresponding to each visual feature of the first scene by applying a contextual attention on the temporally shifted features. Further, the image context tagging engine 110 determines context of the first scene and the second scenes by averaging the temporal shifted visual features using the attention weights. Further, the image context tagging engine 110 determines contextual stable visual features by concatenating the context of the first scene and the second scenes with each visual feature of the first scene and the second scenes. Further, the image context tagging engine 110 reduces a dimension of the contextual stable visual features. Further, the image context tagging engine 110 updates the dimensionally reduced contextual stable features and the objects in the first image frame. Further, the image context tagging engine 110 performs an assignment of the objects in the first image frame with reference to the objects in the plurality of image frames for identifying the objects disappeared in the first image frame with reference to the plurality of image frames.

The memory 120 stores the first image frame. The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than its storage space. In certain examples, a non-transitory storage medium may store data that can, over time, change (e.g., in Random Access Memory (RAM) or cache). The memory 120 can be an internal storage unit or it can be an external storage unit of the electronic device 100, a cloud storage, or any other type of external storage.

The processor 130 is configured to execute instructions stored in the memory 120. The processor 130 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor 130 may include multiple cores to execute the instructions. The communicator 140 is configured for communicating internally between hardware components in the electronic device 100. Further, the communicator 140 is configured to facilitate the communication between the electronic device 100 and other devices via one or more networks (e.g. Radio technology). The communicator 140 includes an electronic circuit specific to a standard that enables wired or wireless communication.

Although the FIG. 1 shows the hardware components of the electronic device 100 but it is to be understood that other embodiments are not limited thereon. In other embodiments, the electronic device 100 may include less or a greater number of components. Further, the labels or names of the components are used only for illustrative purpose and does not limit the scope of the invention. One or more components can be combined together to perform same or substantially similar function for recognizing the image context.

Figure 2:
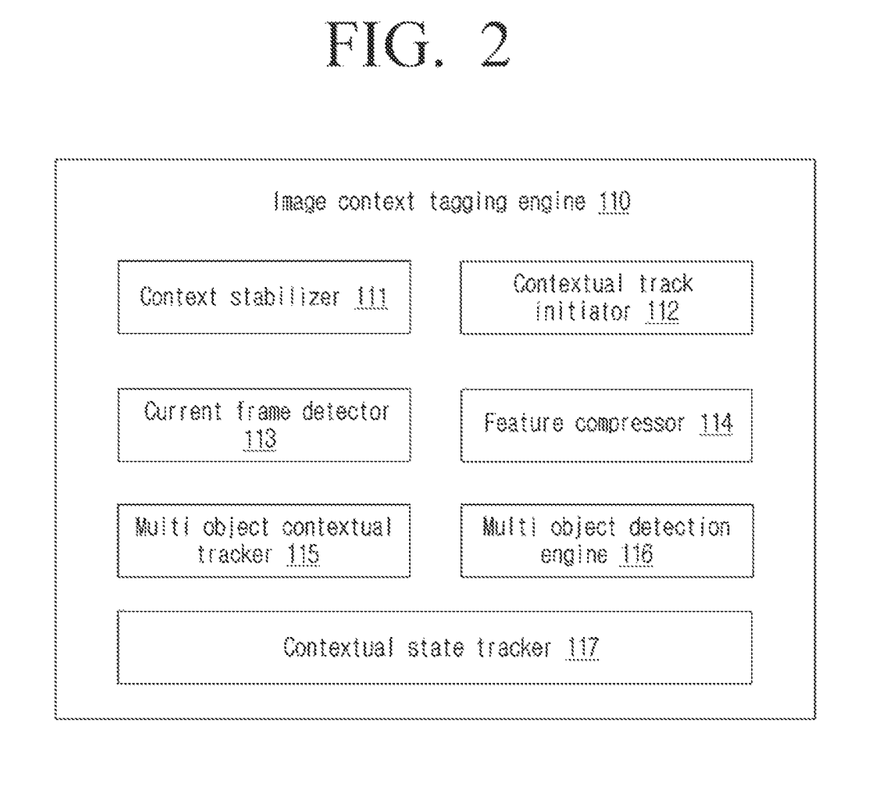
FIG. 2 is a block diagram of an image context tagging engine for determining the contextual information of the captured image frame, according to an embodiment.

FIG. 2 is a block diagram of the image context tagging engine 110 for determining the contextual information of the captured image frame, according to an embodiment. In an embodiment, the image context tagging engine 110 includes a context stabilizer 111, a contextual track initiator 112, a current frame detector 113, a feature compressor 114, a multi object contextual tracker 115, a multi object detection engine 116, and a contextual state tracker 117. The context stabilizer 111, the contextual track initiator 112, the current frame detector 113, the feature compressor 114, the multi object contextual tracker 115, and the multi object detection engine 116, and the contextual state tracker 117 are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

Although the FIG. 2 shows the hardware components of the image context tagging engine 110 but it is to be understood that other embodiments are not limited thereon. In other embodiments, the image context tagging engine 110 may include less or a greater number of components. Further, the labels or names of the components are used only for illustrative purpose and does not limit the scope of the invention. One or more components can be combined together to perform same or substantially similar function for determining the contextual information of the captured image frame.

Figure 3:
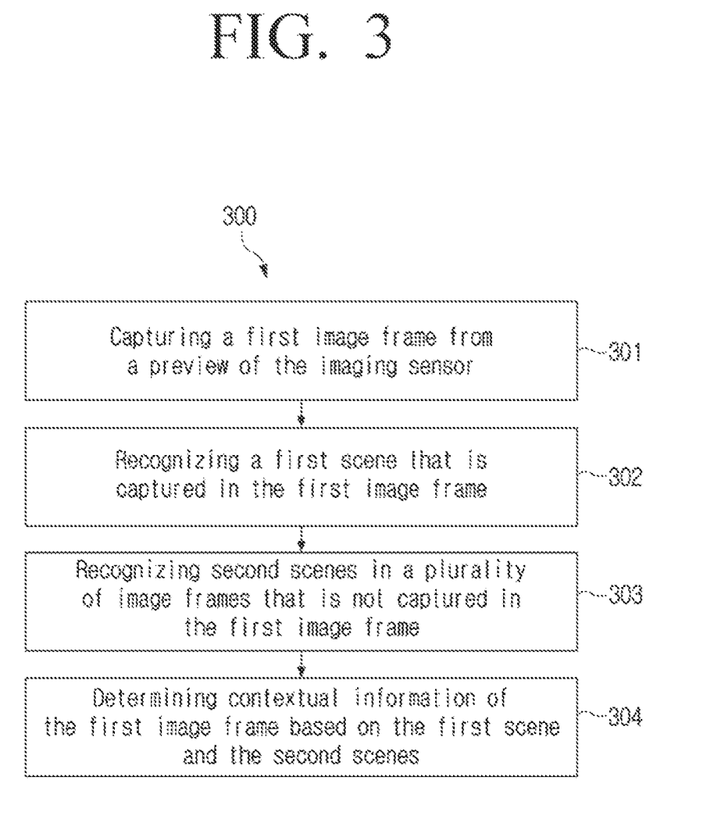
FIG. 3 is a flow diagram illustrating a method for recognizing the image context of the captured image frame, according to an embodiment.

FIG. 3 is a flow diagram 300 illustrating a method for recognizing the image context of the captured image frame, according to an embodiment. In an embodiment, the method allows the image context tagging engine 110 to perform steps 301-304 of the flow diagram 300. At step 301, the method includes capturing the first image frame from the preview of the imaging sensor 150. At step 302, the method includes recognizing the first scene that is captured in the first image frame. At step 303, the method includes recognizing the second scene in the plurality of image frames that is not captured in the first image frame. At step 304, the method includes determining the contextual information of the first image frame based on the first scene and the second scenes.

The various actions, acts, blocks, steps, or the like in the flow diagram 300 may be performed in the order presented, in a different order, or simultaneously. Further, in some embodiments, some of the actions, acts, blocks, steps, or the like may be omitted, added, modified, skipped, or the like without departing from the scope of the invention.

Figure 4:
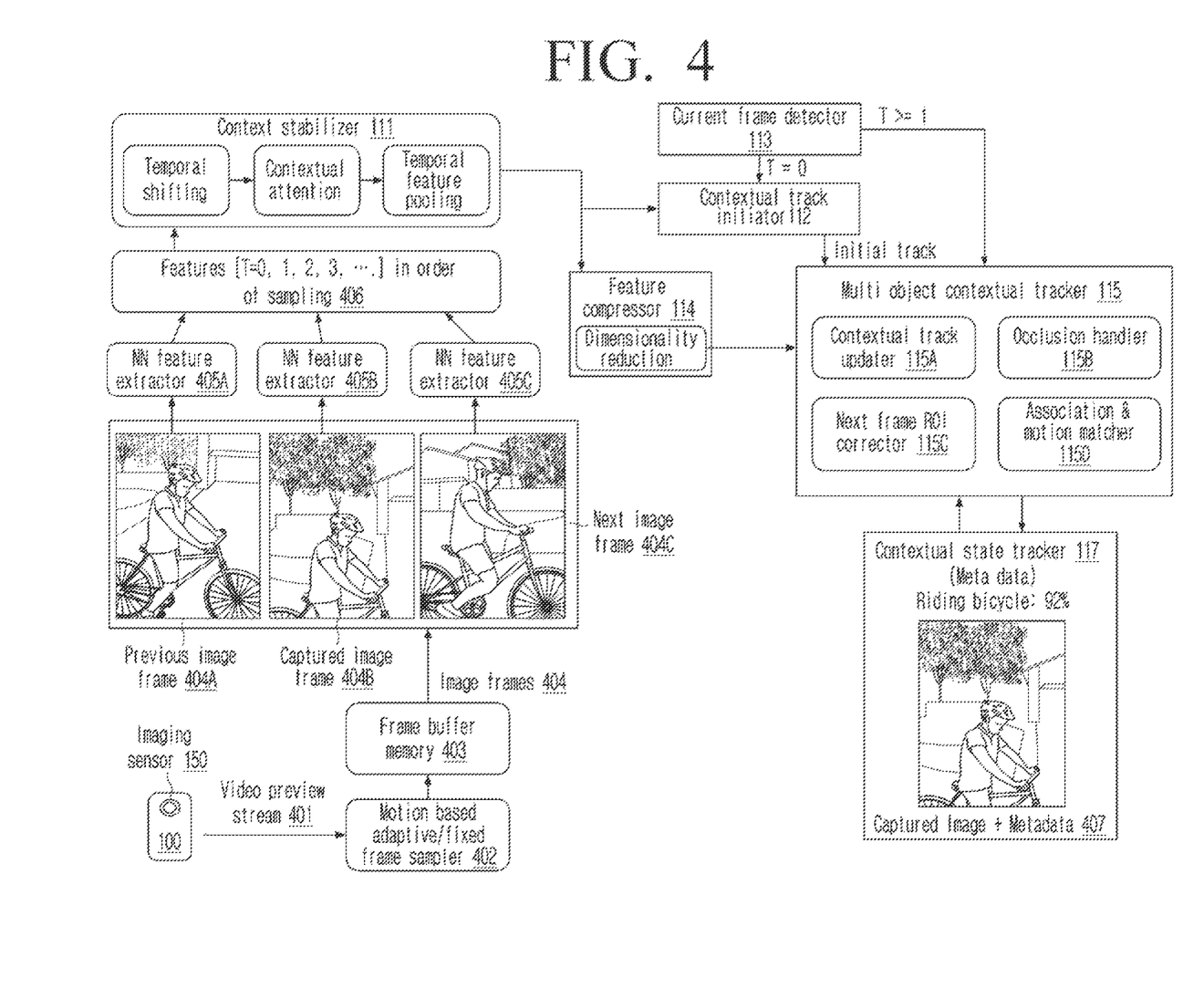
FIG. 4 is a flow diagram illustrating a method for determining the contextual information of the captured image frame, according to an embodiment.

FIG. 4 is a flow diagram illustrating a method for determining the contextual information of the captured image frame, according to an embodiment. In an embodiment, the electronic device 100 includes the imaging sensor 150, a motion based adaptive/fixed frame sampler 402, a frame buffer memory 403, a plurality of Neural Network (NN) feature extractors 405A-405C, the context stabilizer 111, the contextual track initiator 112, the current frame detector 113, the feature compressor 114, the multi object contextual tracker 115, the multi object detection engine 116, and the contextual state tracker 117. In an embodiment, the multi object contextual tracker 115 includes a contextual track updater 115A, an occlusion handler 115B, a next frame ROI corrector 115C, and an association & motion matcher 115D.

The motion based adaptive/fixed frame sampler 402 captures the first image frame 404B from the video preview stream 401 of the imaging sensor 150. Out of the stream of the frames 401, few frames that can be used for later stage processing. The motion based adaptive/fixed frame sampler 402 performs adaptive sampling to maximize amount of information being captured compared to fixed sampling mechanism. The frame buffer memory 403 is a storage buffer that holds a fixed number of frames. The NN feature extractor 405B recognizes the first scene that is captured in the first image frame 404B. The NN feature extractors 405A, 405C recognize second scenes in the plurality of image frames 404A, 404C that is not captured in the first image frame 404B. The plurality of NN feature extractors 405A-405C provides the extracted features 406 to the context stabilizer 111.

The context stabilizer 111 receives the features 406 from the plurality of NN feature extractors 405A-405C. The context stabilizer 111 replaces a 10% of the captured frame's features are replaced by previous frames features, and another 10% of the captured frame's features is replaced by features from next frame, which is a bidirectional shifting of the features in temporal dimension. Further, the context stabilizer 111 provides a previous/next frame aware features after the bidirectional shifting of the features in the temporal dimension. The context stabilizer 111 performs a contextual attention using a transformer block between the captured image frame and previous frame's temporally shifted features by performing dot product attention, in which a dot product is performed between the current frame features and the contextual features. These dot products represent similarity of the current frame features to the contextual features. Further, the context stabilizer 111 performs SoftMax normalization across a dimension representing a context size, which gives a set of attention weights for each of the context features corresponding to the current feature. Further, the context stabilizer 111 performs temporal pooling on the temporal shifted features and the attention weights. The context stabilizer 111 performs an attention weighted averaging of the contextual features (i.e. set of attention weights). The averaged feature is determined as context, where the averaged feature is concatenated with the current feature to generate a temporally/contextual stable visual feature.

The feature compressor 114 compresses the contextually stable feature using neural dimensionality reduction technique. The current frame detector 113 crates bounding boxes around the objects detected in the current image frame. The contextual track initiator 112 initializes at T=0 with current frames features and all the detected objects in current frame. The contextual track updater 115A initializes at T>0 and updates with current frame's contextually stable features and all the detected objects in the current frame. The contextual track updater 115A also performs the assignment of objects in the current frame to the objects in previous frames. The contextual track updater 115A identifies new objects as well as objects that disappeared. There are cases where objects are missed due to occlusions, to solve this the occlusion handler 115B uses sparse features and motion heuristics, which can recover missed objects. We have designed heuristics based linear constraints and linear cost function that is solved by a linear programming solver. The contextual state tracker 117 is a data structure that stores compressed metadata of the context of the current frame, the stabilized classification tag, object detections and sparse features for later analysis. The contextual state tracker 117 contains information about the ROI association across frame.

In an embodiment, the context stabilizer 111 determines the contextual information of the first image frame based on the first scene and the second scenes. Further, the multi object contextual tracker 115 stores the contextual information as the metadata along with the first image frame in the memory 120. In an embodiment, the multi object contextual tracker 115 tags the image frame with the contextual information in the preview. In another embodiment, the context stabilizer 111 receives the input from the user and edits the contextual information based on the input from the user.

In an embodiment, the multi object detection engine 116 identifies the objects in the first image frame. Further, the contextual track updater 115A identifies the objects disappeared in the first image frame with reference to the plurality of image frames. Further, the occlusion handler 115B recovers the objects disappeared in the first image frame with reference to the plurality of image frames using the heuristics based linear constraints and the linear cost function. Further, the image context tagging engine 110 determines the contextual information of the first image frame based on the objects in the first image frame and the recovered objects.

In an embodiment, the plurality of NN feature extractors 405A-405C extracts the visual features from the first scene and the second scenes. Further, the context stabilizer 111 performs bidirectional temporal shifting of the visual features in the temporal dimension. Further, the context stabilizer 111 determines the attention weights for each visual feature of the second scenes corresponding to each visual feature of the first scene by applying the contextual attention on the temporally shifted features. Further, the context stabilizer 111 determines the context of the first scene and the second scenes by averaging the temporal shifted visual features using the attention weights. Further, the context stabilizer 111 determines the contextual stable visual features by concatenating the context of the first scene and the second scenes with each visual feature of the first scene and the second scenes. Further, the feature compressor 114 reduces the dimension of the contextual stable visual features. Further, the feature compressor 114 updates the dimensionally reduced contextual stable features and the objects in the first image frame. Further, the contextual track updater 115A performs the assignment of the objects in the first image frame with reference to the objects in the plurality of image frames for identifying the objects disappeared in the first image frame with reference to the plurality of image frames.

Figure 5:
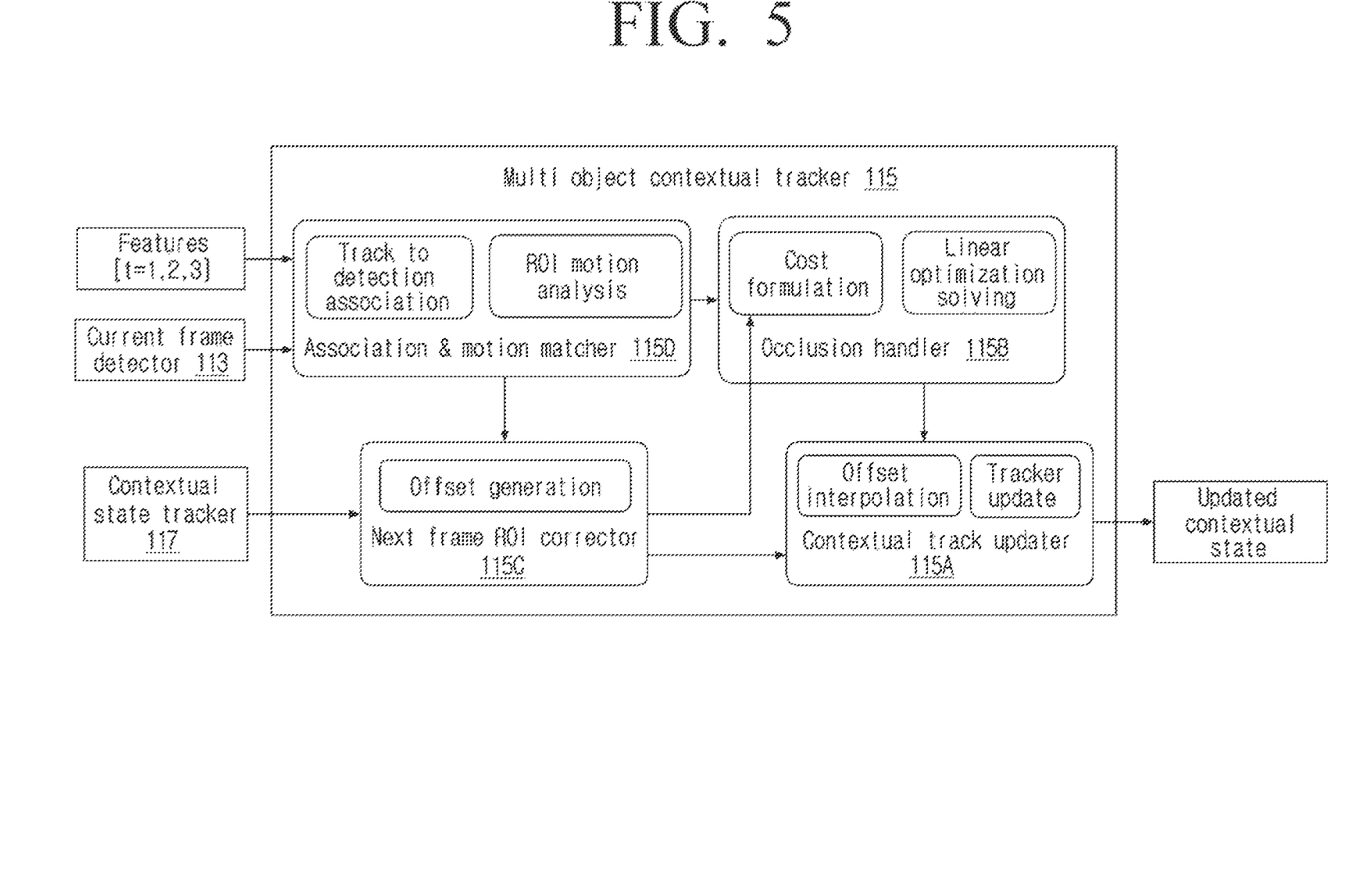
FIG. 5 is a block diagram of a multi object contextual tracker for updating a contextual tracker state, according to an embodiment.

FIG. 5 is a block diagram of a multi object contextual tracker for updating a contextual tracker state, according to an embodiment. The association & motion matcher 115D receives the features extracted from the image frames, and the output of the current frame detector 113 and performs track to detection association, and Region of Interest (ROI) motion analysis on the current detected frame. Further, the association & motion matcher 115D generates a cost matrix between the current tracks and the detections, and solves an assignment problem using Hungarian matching method. The next frame ROI corrector 115C takes the output of the association & motion matcher 115D and the contextual state tracker 117, and generates with a shallow network offsets for next frame for each of the detections for maintaining stability of detection prediction, where a smoothing interpolation is used before being stored in the updated contextual state tracker data structure. The occlusion handler 115B recovers the objects disappeared in the first image frame with reference to the plurality of image frames using the heuristics based linear constraints and the linear cost function. The contextual track updater 115A performs offset interpolation and updates the output of the contextual state tracker 117. The contextual track updater 115A selects past frames by smartly selecting duration based on current frame context. The contextual track updater 115A selects future frames by limiting selection to very few future frames.

Figure 6:
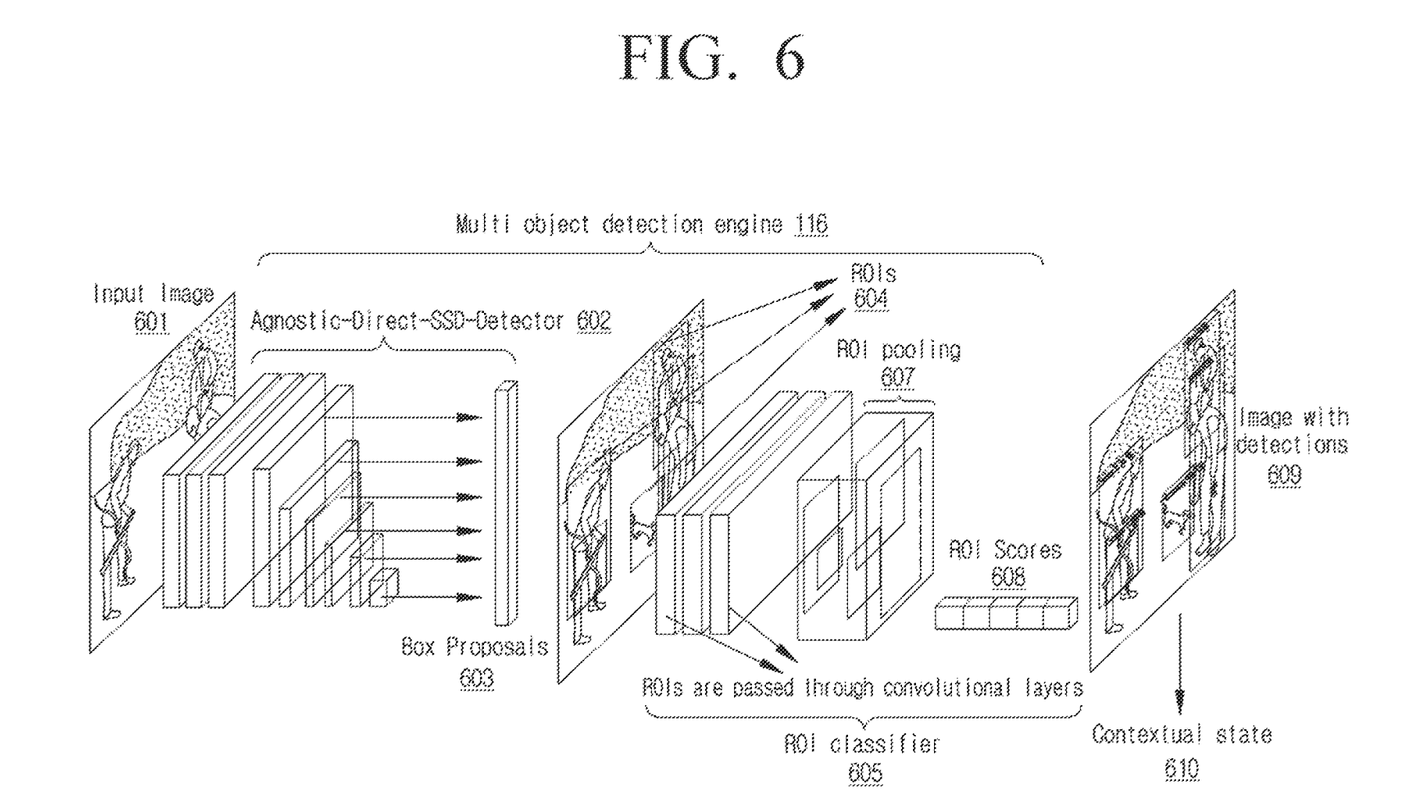
FIG. 6 is a schematic diagram illustrating a method for detecting multi objects in image frame, according to an embodiment.

FIG. 6 is a schematic diagram illustrating a method for detecting multi objects in the image frame, according to an embodiment. The multi object detection engine 116 receives the image frame 601. The multi object detection engine 116 performs agnostic-direct-SSD-detection 602 on the image frame and proposes bounding boxes 603 in the image frame, where the bounding boxes represent the ROIs 604. The multi object detection engine 116 passes the ROIs through convolutional layers to classify the ROIs 605. Further, the multi object detection engine 116 performs pooling 607 on the ROIs and determines the scores 608 for each ROI. Further, the multi object detection engine 116 detects the objects 609 in the image and determines the contextual state 610 based on the scores of each ROI.

Figure 7:
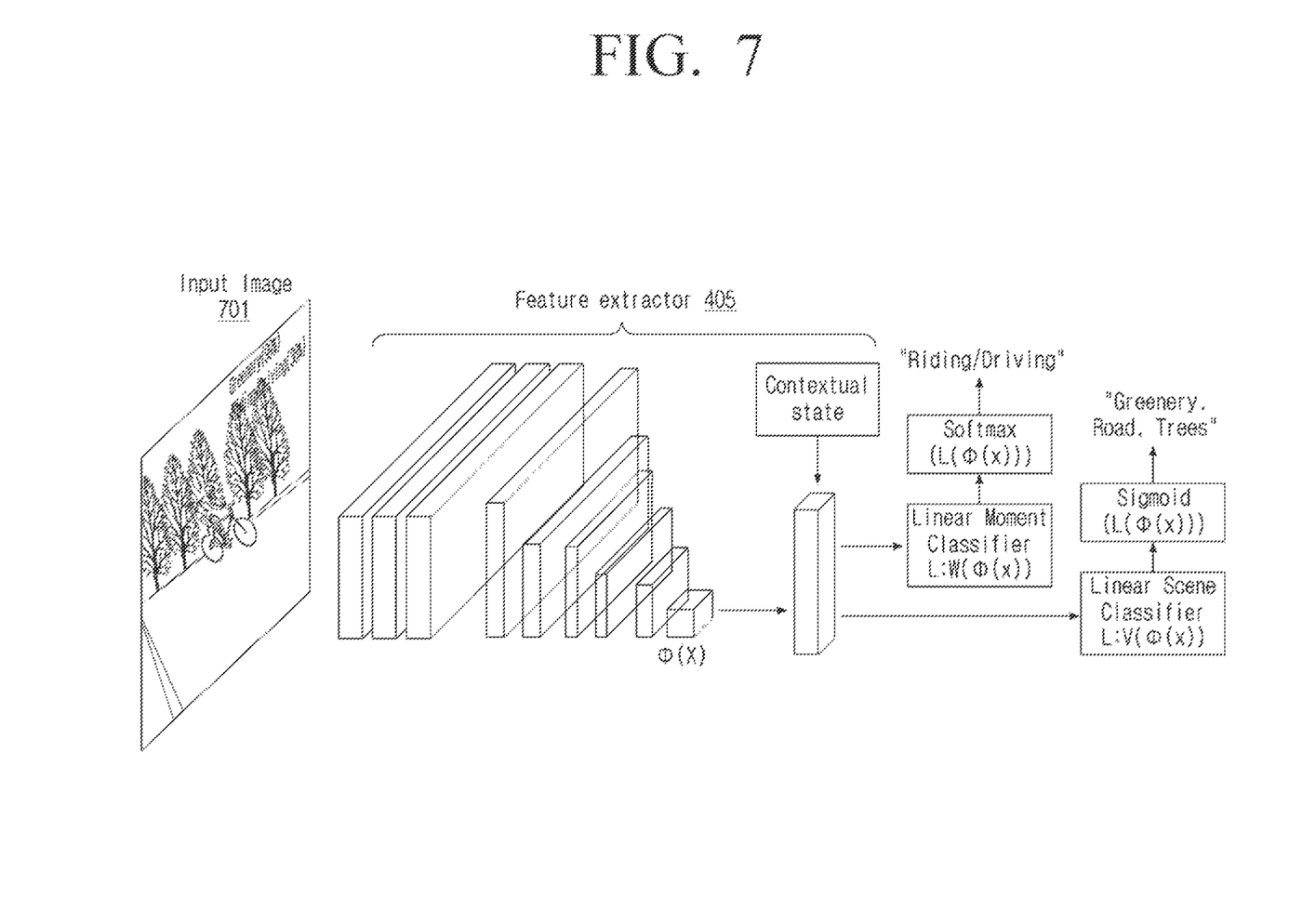
FIG. 7 is a schematic diagram illustrating a method for moment recognition and scene recognition, according to an embodiment.

FIG. 7 is a schematic diagram illustrating a method for moment recognition and scene recognition, according to an embodiment. The feature extractor 405 receives the image frame 701. The feature extractor 405 creates a tensor $\phi(x)$ by passing the image frame through convolution neural networks based on the contextual state. The tensor $\phi(x)$ is combination of image feature and the contextual state, the features from previous and next frames are used to update the contextual state. The image context tagging engine 110 performs liner moment classification $W(\phi(x))$ followed by SoftMax operation on the tensor $\phi(x)$ for the moment recognition. The image context tagging engine 110 performs liner scene classification $W(\phi(x))$ followed by sigmoid operation on the tensor $\phi(x)$ for the scene recognition. W is a linear layer for moment recognition, which is different from V for scene classification.

FIGS. 8 and 9 illustrate example scenarios of determining the contextual information of the captured image frame, according to an embodiment. Consider, a scenario of uncovering a car in a car showroom shown in FIG. 8. While capturing an image 801 by the electronic device 100, the scene is: the car is covered with a cover. The covered car in the captured image 801 is actually looks like a bean bag, where conventional devices determines the context of the image 801 as "bean bag". The proposed electronic device 100 analyses subsequent image frames 802, 803 in the preview of the imaging sensor 150 of the electronic device 100, and identifies the car from the subsequent image frames 802, 803. Thus, the electronic device 100 tags the context of the captured image 801 with "car".

Consider, a scenario of riding a cycle by a person shown in FIG. 9. While capturing an image 902 by the electronic device 100, the scene is: an upper portion of the person, in which the cycle is not visible. The captured image 902 includes only the upper portion of the person, where conventional devices determines the context of the image 902 as "a person". The proposed electronic device 100 analyses the previous image frame 901 and the next image frame 903 in the preview of the imaging sensor 150 of the electronic device 100, and identifies the person riding the cycle from the previous image frame 901 and the next image frame 903. Thus, the electronic device 100 tags the context of the captured image 902 with "a person riding the cycle".

The embodiments disclosed herein can be implemented using at least one hardware device to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for recognizing image context by an electronic-device, device, the method comprising:
    capturing a first image frame from a preview of an imaging sensor of the electronic device;
    recognizing a first scene that is captured in the first image frame;
    recognizing at least one second scene in a plurality of image frames that is not captured in the first image frame; and
    determining contextual information of the first image frame based on the first scene and the at least one second scene,
    wherein the determining the contextual information of the first image frame based on the first scene and the at least one second scene comprises:
    identifying objects in the first image frame,
    extracting visual features from the first scene and the at least one second scene,
    performing bidirectional temporal shifting of the visual features in temporal dimension,
    determining attention weights for each visual feature of the at least one second scene corresponding to each visual feature of the first scene by applying a contextual attention on the temporally shifted features,
    determining context of the first scene and the at least one second scene by averaging the temporal shifted visual features using the attention weights,
    determining contextual stable visual features by concatenating the context of the first scene and the at least one second scene with each visual feature of the first scene and the at least one second scene,
    reducing a dimension of the contextual stable visual features,
    updating the dimensionally reduced contextual stable features and the objects in the first image frame,
    performing an assignment of objects in the first image frame with reference to the objects in the plurality of image frames for identifying the objects that disappeared in the first image frame with reference to the plurality of image frames,
    recovering the objects that disappeared in the first image frame with reference to the plurality of image frames using a heuristics based linear constraint and a linear cost function, and
    determining the contextual information of the first image frame based on the objects in the first image frame and the recovered objects.

2. The method of claim 1, further comprising:
    storing the contextual information as metadata along with the first image frame.

3. The method of claim 1, wherein the method further comprises:
    tagging the first image frame with the contextual information in the preview.

4. The method of claim 1, wherein the method further comprises:
    receiving an input from a user; and
    editing the contextual information based on the input from the user.

5. An electronic device comprising:
a memory storing instructions;
an imaging sensor; and
a processor configured to execute the instructions to:
capture a first image frame from a preview of the imaging sensor,
recognize a first scene that is captured in the first image frame,
recognize at least one second scene in a plurality of image frames that is not captured in the first image frame, and
determine contextual information of the first image frame based on the first scene and the at least one second scene,
wherein the processor is further configured to execute the instructions to:
identify objects in the first image frame,
extract visual features from the first scene and the at least one second scene,
perform bidirectional temporal shifting of the visual features in temporal dimension,
determine attention weights for each visual feature of the at least one second scene corresponding to each visual feature of the first scene by applying a contextual attention on the temporally shifted features,
determine context of the first scene and the at least one second scene by averaging the temporal shifted visual features using the attention weights,
determine contextual stable visual features by concatenating the context of the first scene and the at least one second scene with each visual feature of the first scene and the at least one second scene,
reduce a dimension of the contextual stable visual features,
update the dimensionally reduced contextual stable features and the objects in the first image frame,
perform an assignment of the objects in the first image frame with reference to the objects in the plurality of image frames for identifying objects that disappeared in the first image frame with reference to the plurality of image frames,
recover the objects that disappeared in the first image frame with reference to the plurality of image frames using a heuristics based linear constraint and a linear cost function, and
determine the contextual information of the first image frame based on the objects in the first image frame and the recovered objects.

6. The electronic device of claim 5, wherein the processor is further configured to execute the instructions to:
store the contextual information as metadata along with the first image frame.

7. The electronic device of claim 5, wherein the processor is further configured to execute the instructions to:
tag the first image frame with the contextual information in the preview.

8. The electronic device of claim 5, wherein the processor is further configured to execute the instructions to:
receive an input from a user; and
edit the contextual information based on the input from the user.

9. A non-transitory computer readable medium for storing computer readable program code or instructions which are executable by a processor to perform a method for recognizing image context, the method comprising:
capturing a first image frame from a preview of an imaging sensor of an electronic device;
recognizing a first scene that is captured in the first image frame;
recognizing at least one second scene in a plurality of image frames that is not captured in the first image frame; and
determining contextual information of the first image frame based on the first scene and the at least one second scene,
wherein the determining the contextual information of the first image frame based on the first scene and the at least one second scene comprises:
identifying objects in the first image frame,
extracting visual features from the first scene and the at least one second scene,
performing bidirectional temporal shifting of the visual features in temporal dimension,
determining attention weights for each visual feature of the at least one second scene corresponding to each visual feature of the first scene by applying a contextual attention on the temporally shifted features,
determining context of the first scene and the at least one second scene by averaging the temporal shifted visual features using the attention weights,
determining contextual stable visual features by concatenating the context of the first scene and the at least one second scene with each visual feature of the first scene and the at least one second scene,
reducing a dimension of the contextual stable visual features,
updating the dimensionally reduced contextual stable features and the objects in the first image frame,
performing an assignment of the objects in the first image frame with reference to the objects in the plurality of image frames for identifying objects that disappeared in the first image frame with reference to the plurality of image frames,
recovering the objects that disappeared in the first image frame with reference to the plurality of image frames using a heuristics based linear constraint and a linear cost function, and
determining the contextual information of the first image frame based on the objects in the first image frame and the recovered objects.

10. The non-transitory computer readable medium of claim 9, wherein the method further comprises:
storing the contextual information as metadata along with the first image frame.

11. The non-transitory computer readable medium of claim 9, wherein the method further comprises:
tagging the first image frame with the contextual information in the preview.

12. The non-transitory computer readable medium of claim 9, wherein the method further comprises:
receiving an input from a user; and
editing the contextual information based on the input from the user.

* * * * *